US006681217B1

(12) United States Patent
Lewak

(10) Patent No.: US 6,681,217 B1
(45) Date of Patent: Jan. 20, 2004

(54) BOOLEAN TEXT SEARCH COMBINED WITH EXTENDED REGULAR EXPRESSION SEARCH

(76) Inventor: Jerzy Lewak, 107 S. Cedros Ave., Solana Beach, CA (US) 92075

(*) Notice: Subject to any disclaimer, the term of this patent is extended or adjusted under 35 U.S.C. 154(b) by 0 days.

(21) Appl. No.: 09/426,455

(22) Filed: Oct. 25, 1999

Related U.S. Application Data

(60) Provisional application No. 60/105,722, filed on Oct. 27, 1998.

(51) Int. Cl.$^7$ ............................................. G06F 17/00
(52) U.S. Cl. ............................................. 707/3; 707/4
(58) Field of Search ................... 707/1–7, 103, 707/100, 200–201; 715/500, 500.1

(56) References Cited

U.S. PATENT DOCUMENTS

| | | |
|---|---|---|
| 480,982 A | 8/1892 | Wohlfarth |
| 706,147 A | 8/1902 | Baldwin |
| 819,762 A | 5/1906 | Keefe |
| 934,425 A | 9/1909 | Callahan |
| 1,017,015 A | 2/1912 | Perkins |
| 1,025,916 A | 5/1912 | Kincaid |
| 1,111,308 A | 9/1914 | Kincaid et al. |
| 1,219,824 A | 3/1917 | Kinzer |
| 1,225,336 A | 5/1917 | Jones |
| 1,239,448 A | 9/1917 | Armburst |
| 1,972,371 A | 9/1934 | Bonnifield |
| 2,051,967 A | 8/1936 | Saito et al. |
| 2,051,968 A | 8/1936 | Saito et al. |
| 2,053,302 A | 9/1936 | Saito et al. |
| 2,686,155 A | 8/1954 | Willis et al. |
| 2,971,625 A | 2/1961 | Rix |
| 4,273,219 A | 6/1981 | Ito |
| 4,523,668 A | 6/1985 | Uematsu et al. |
| 4,915,195 A | 4/1990 | Dial |
| 4,930,600 A | 6/1990 | Kumar et al. |
| 5,085,292 A | 2/1992 | Dial |
| 5,173,204 A | 12/1992 | Chiddick et al. |
| 5,288,792 A | 2/1994 | Buxbaum |
| 5,305,853 A | 4/1994 | Ross et al. |
| 5,308,516 A | 5/1994 | Chiddick |
| 5,477,941 A | 12/1995 | Kumar et al. |
| 5,664,172 A * | 9/1997 | Antoshenkov .................. 707/3 |

FOREIGN PATENT DOCUMENTS

| | | |
|---|---|---|
| EP | 0 542 357 A1 | 11/1992 |
| EP | 0 542 358 A1 | 11/1992 |

OTHER PUBLICATIONS

Kelsan Lubricants Ltd., Exerpt from The Evaluation of Century Oil Lubrication Products, Association of American Railroads, Jul. 1991, p. 12–13 and 16–17.
Kelsan Lubricants USA, LLC., Centrac VHPF Traction Enhancer, 1996.

* cited by examiner

*Primary Examiner*—Alford Kindred
(74) *Attorney, Agent, or Firm*—Martin J. Jaquez; William C. Boling; Jaquez & Associates

(57) ABSTRACT

In the field of computer text search engines, regular expression text pattern matching is combined with an extended set of Boolean operators. A pre-processor is described which will convert mixed Boolean-GREP expressions into equivalent pure GREP expressions enabling existing GREP search technology to be used to implement this invention. Additional optimizations are described when users need to search for any one of a list of text patterns.

27 Claims, No Drawings

BOOLEAN TEXT SEARCH COMBINED WITH EXTENDED REGULAR EXPRESSION SEARCH

This application claims the benefit of provisional application Ser. No. 60/105,722 filed Oct. 27, 1998.

BACKGROUND

Computer based text searches have many applications. Some of these include applications to automated Taxonomy, the categorization of text documents. The most prominent applications, however, though certainly not the most sophisticated, are those on the Internet. Most Internet based companies, such as Alta Vista, Yahoo, or Excite, provide users with a simple, literal text search function. Some of them also provide an "Advanced Search" function.

When using the simple, literal search function, the user types in the literal word or words to be found, and the search engine lists all the found texts. Many such search engines appear to allow for some synonyms of the words typed and are largely word based, that is, unless the text typed by the user is placed in quotes (or designated as literal in some other way) the search assumes a match if the typed words appear in a document in any order and in most search engines, with the implied "OR" between every word and the next one. To distinguish the different possibilities, the found documents or URLs (Universal Resource Locators) are often listed with the "best" matches first. Apparently, "best" matches means those which contain the largest number of the typed words.

For example, when we are searching for documents containing the words "search engines" typing these into the simple AltaVista search engine finds over 680,000 documents!

Advanced search engines allow a full "logical" or boolean search, by which is meant that words or phrases can be combined using the boolean operators "AND", "OR", "NOT", and NEAR. (Usually NEAR means within 10 words of each other, and this number of words is not under users control.)

For example, to find documents containing the word "education" and either the word "Internet" or "networking" or "network" but not containing the words "school" or "college" the user would type the advanced search expression:

education AND (networking OR network OR Internet) AND NOT (school OR college)

Such a set of boolean operator features gives the user greater control of the text being searched. It makes it easier to find the searched for document amongst the millions of available documents, by allowing the user to narrow down the description of the documents of interest.

A little more control is provided by a "wild character" feature, which allows the user to substitute a special symbol, the wild character, for any uncertain character. Another feature, sometimes available, allows for either the presence or absence of any wild character so designated.

As users of the search engines become more discriminating and more experienced, they will demand more control than even the current advanced search engines can provide.

For example regarding the target, it would be useful to specify that the words searched for must all be within a sentence, or perhaps within a paragraph, rather than, as at present, anywhere in the document. Clearly the chances that a document, containing the specified words, is the one we want is lower if these words are spread throughout a long document, rather than if they are all within one sentence, or one paragraph. Such a feature is not currently available with search engines on the Internet, though it is available, for example, in a search tool for Eudora Email called "PowerSleuth" distributed by Nisus Software Inc.

Other possible extensions of search features include a complete text-pattern description language, allowing users to describe the text pattern without the need to know the specific text. For example, we may want to search for documents or web pages of a particular company containing a phone number or a street address without knowing either, or precisely because we do not know them. Such text pattern matching is implemented in the Unix search tools which support "Regular Expressions" for describing text patterns and are referred to as GREP searches.

An example of a text pattern matching engine, implemented as part of a Macintosh word processor, is the PowerFind™ and PowerFind Pro features within the Nisus Writer word processor for the Macintosh, first published as a software product in January of 1989 under the U. S. registered trade name "Nisus" and in more recent versions re-named "Nisus Writer."

The PowerFind Pro engine, implemented in Nisus Writer, is an extension of the Unix GREP and includes only one boolean operator: the "OR." The "AND' operator can however be simulated by using the "OR" and the other features of PowerFind or PowerFind Pro. However simulating an "AND" is not very convenient. Simulating the NOT operator is not possible without additional features.

THE INVENTION

The present invention combines the features of the full boolean search with the extended Regular Expression search features, adding the control of the search target, to create a more powerful and useful search engine than any presently available. In addition, the invention adds several more boolean search features (such as the user definable NEAR, the FOLLOWED BY, and the NOT FOLLOWED BY binary operators) and extends further some of the already extended Regular Expression features from PowerFind Pro of Nisus Writer. The straight forward combination of a Regular Expression search engine and an extended Boolean search engine results in two types of OR and two types of parentheses: one used in GREP expressions and one used in Boolean expressions. Mixed expressions have to be parsed twice: once by the Regular Expression Parser the second time by the Boolean parser.

Grep expressions can be concatenated to form new meaningful expressions whose match is the concatenation of the respective matches—an intuitive result. Logical expressions, on the other hand, can only be concatenated using one of the binary boolean operators.

For example, using uppercase to designate operators and lowercase to designate any boolean expression, the boolean expression NOT z cannot generally be concatenated with the boolean expression NOT a to form a meaningful boolean expression, except by using one of the binary logical operators, such as either OR or AND, between them. So one possibility where the two expressions are combined would be:

NOT z AND NOT a

This specifies the contents of the target independently of the positions of the matches to the boolean "a" or the boolean "z". However, frequently we need to search for a text string which can be intuitively designated as (NOT z)(NOT a)

which means

NOT z IMMEDIATELY FOLLOWED BY NOT a or using a more understandable description NOT z NOT IMMEDIATELY FOLLOWED BY a, which could also be designated as:

NOT (az)

once concatenation of a and z is defined.

It is relatively simple to define such concatenations of boolean expressions. Including such concatenations is equivalent to the unification of the GREP language with the Boolean language. Such a unification is a great convenience to the user and is an innovation.

The combined availability of both the Regular Expression language and the Boolean operators (other than OR) is also an innovation—even when the user has to correctly formulate the search expressions so as not to (illegally) imply concatenation of boolean expressions—that is, even before unification of booleans with Regular Expressions.

Boolean Expressions often need the definition of the "Search Target." In current search engines on the Internet, the Search Target is implicitly the whole document, or web page and the user has no ability to control that. As exemplified in the Introduction above, it is often useful to give the user better control of what part of the text is to contain the defined search pattern. This is best done by formally defining the Search Target. Although defining the search target in itself is not new, its combination with Regular Expressions and boolean searches is new and its use for searchers on the Internet is also new.

DEFINITION OF TERMS

For clarity, we define terms to be used in the following discussion.

The Search Pattern is the text pattern, defined by the user (either using special symbols, or choosing them from lists or menus) which the search engine is to search for, within the Search Target of the text. For example, when searching for "Nisus Software" the string in quotes is the literal Search Pattern. Another example of the Search Pattern is a Regular Expression (RE) Search Pattern. For example the following simple regular expression will find a sequence of digits at the beginning of a paragraph:

^:d+ where "^" stands for "the beginning of a paragraph," ":d" stands for any digit, and the "+" stands for "occurring one or more times" referring to the digit. In applications, each of these symbols can be made a distinctive symbol so as not to be confused by the user from any similar characters which are meant to be search literally. In what follows, we shall use normal character combinations to make up Regular Expressions, leaving it to the implementation to use special symbols. Good examples of such use of special custom symbols are the, already mentioned implementations of the PowerFind feature in Nisus Writer and in PowerSleuth.

When boolean operators are included in a Search Pattern, the result is a Boolean Search Pattern.

The Search Target, is that sub-text element which is to be searched through for an instance of the Search Pattern. For example, if the Search Target is a sentence, and the Search Pattern, is:

Nisus AND Software any sentence which contains both the word "Nisus" and the word "Software" without regard to the order of occurrence, would be found as a match. Sentences in which the word "Nisus" occurs in one sentence and "Software" in another would not be found as a match to the expression.

Boolean, RE and combined searches are made much more useful when the definition of the Search Target is included.

The Matched Text is the context text, within the Search Target, which matches the text description defined by the Search Pattern. For example, suppose the Search Pattern is defined by:

\<:w:w:w:w\> where each ":w" stands for any character which can be part of a word, and "\<" stands for the beginning of a word, and "\>" for the end of a word (each of which is not a character just a position) then the example text pattern represents any four letter word. If the first four letter word found by the search engine is the word "hand" then that is the Matched Text for that particular find result. As can be seen the Matched Text for any Search Pattern other than an exact literal one, depends on the found instance. With the same Search Pattern, the Matched Text can be different on different finds.

The Referenced Text is defined as that part (or all) of the Matched Text which matches the parenthesized part of the Search Pattern. For example, the following Search Pattern finds contiguous identical paragraphs.

^(.+\r)\1+ where the period "." stands for any character except the return character (or the return-linefeed combination on Windows systems or the line-feed character on the Unix systems); the "\r" stands for the return character (or its equivalents on the different systems); the plus "+" following the period means any sequence of one or more such characters; the parentheses do not change the Search Pattern, but create a reference to the text, which is matched by the sequence of characters at the beginning of a paragraph. The subsequent "\1" refers to this Referenced Text, and means that the same text is repeated in the next paragraph. The "+" following that means that the repeated text may occur one or more times. Such an expression, for example, can be used to find repeated words or phrases in an alphabetized list of such words of phrases.

Boolean Operators are represented by the following words (though special symbols may be used instead of these words in the software implementation): AND, OR, NOT, NEAR, FOLLOWED BY, NOT FOLLOWED BY. Each of these operators (except NOT on its own) may be used to join any two Search Patterns to form a more complex Search Pattern, and so are called Binary Operators. The combinations AND NOT, and NOT FOLLOWED BY are also Binary. The operator NOT on its own is a Unary Operator and negates the presence of the Search Pattern that follows it.

RE Search Pattern is a Search Pattern which does not contain any boolean operators other than the Or.

Boolean Search Pattern is one which contains one or more Boolean Operators.

Reference Parentheses are parentheses whose purpose is that of grouping of Search Patterns, of defining or clarifying the precedence of their evaluation, and of creating a reference to that text which matches the parenthesized Search Pattern.

N R Parentheses (Non-Referencing Parentheses) are those which do not create a reference to the matched text but have the other functionalities of parentheses, i.e. of grouping expressions and defining the precedence of their evaluation.

TYPES OF PARENTHESES

All parentheses have the usual functionality of grouping the parenthesized Search Patterns into units, and of determining the precedence of the Boolean Operators in a Boolean Search Pattern. Expressions are evaluated, as usual, from the innermost to the outermost parentheses, and from left to right.

When parentheses do not intervene, the order of precedence of the Boolean Operators in evaluation is as follows:

NEAR
AND
FOLLOWED BY
AND NOT
NOT FOLLOWED BY
OR
NOT means a negation of the Search Pattern which follows.

For example the complex Search Pattern:

Nisus NOT Software will be interpreted as

Nisus NOT FOLLOWED BY Software and means that the search is to find an instance of the word "Nisus" not immediately followed by the word "Software".

There are two useful meanings of AND, for which we shall use two different words. The usual meaning, for which we use the word AND, is a search for the two conjoined Search Patterns, regardless of the order of their occurrence. The other meaning takes their order into account, (though any text can be between them) and so we designate it as FOLLOWED BY. For example:

Nisus FOLLOWED BY Software which means that Software is to succeed (anywhere within the target) the word Nisus.

The meaning of NEAR is optionally modifiable by the user. It is in fact a conditional AND. Its meaning is illustrated by the following example:

Nisus NEAR Software

This means, find the Search Target which contains the two conjoined words with no more than the user defined number of words between them. The default number may be chosen as, say 20, and the user can define a different number for each instance of use of this operator.

User designation of the target is particularly needed in the use of NEAR.

EXTENDED REGULAR EXPRESSIONS

The extended Regular Expressions, a part of the current invention, allow for a Search Pattern description that is as specific or as broad as the user wishes.

The full set of extended Regular Expression symbols includes the following:

1 Wild Cards & Expressions. The following is a list of elementary expressions, forming a part of the extended Regular Expression system, which are used to define a search pattern. The words or symbols in bold represent the possible menu displays as well as the possible displayed expression custom symbol when entered into the find window. The symbols following the legend "Shorthand:" at the end of the description represent the shorthand symbols that will be used in what follows and can also be used in implementations which allow users to type in these expressions:

(i) Any Character. This includes any character whatever, except the Return or new paragraph character. Shorthand: .

(ii) Any Character or ¶. This includes any character and includes the Return or new paragraph character. Shorthand: :.

(iii) Any Word. The definition of a word includes a sequence of alphanumeric characters, excluding any characters which are word separators. It also includes a sequences of digits, commas and period when not followed by a space, tab or return. The definition uses a look-up of word separators and another look-up of characters that can be part of a word (the legal word characters abbreviated as ":w"). A word is defined as any sequence of :w. The beginning of a word is before the first :w character and the end is after the last :w character in the sequence. Characters which are neither word separators nor parts of words can only occur between words. In English there are two characters, the comma and the period, which can be part of a number-word but not part of a letter-word. They make the definition of a word context dependent. Therefore a period and a comma can be interior characters of a word if they are surrounded by numbers. This definition does allow such objects as, for example, "23,34.89.90, 80" to be treated as words, although that may not make sense. Special checks can, optionally, be provided for such cases. The word separators depend on the language and are often defined by the operating system. Any word is so defined (by specifying, for example, an optional word separator character on each side) that a sequence of words, separated by punctuation marks can be matched by the expression "Any Word repeated one or more times." Shorthand: ≈

(iv) Any Sentence. The definition of a sentence is also language and context dependent. Sometimes, it is even meaning dependent, so it is difficult to have a foolproof definition. The Nisus Writer Regular Expression (using the notation defined here, with the additional operator "|" meaning "OR") that works very well is the following: \<(:u\.|:d+\.:d*|:d*\.:d+|[^.!:;?])+\> Translated into descriptive words it is the following: The beginning of a word, (any uppercase followed by a period or any digit sequence including possibly one period or any character which is not one of the characters ending a sentence) occurring one or more times, end of word. Shorthand: Ω

(v) Any Long Sentence(20) . . . When this is chosen, optionally a dialog appears with "Sentence exceeding 20 words" Where the number 20 is editable. The last typed number is remembered for all sessions, current and future and is displayed on the menu. This may be integrated into the "Any Sentence" wild card. Shorthand: Σ

(vi) Any Paragraph. A paragraph ends on a Return (or new paragraph character) or the end of text and begins after a return or at beginning of text. Shorthand: ¶

(vii) Any Text. This is essentially Any Character or paragraph break, repeteated any number of times, longest match. This is useful when styled text search is used or when it is used as part of a more complex expression. Shorthand: Å

(viii) Any Text, Short. This is the same as the above but with the shortest possible match. Shorthand: ȧ

(ix) Any HTML Tag. Any legal HTML tag would be matched. Shorthand: Ȯ

(x) A–Z a–z This means any alphabetic. Shorthand: :a (xi) A–Z a–z 0–9 This means any alphanumeric. Shorthand: :n (xii) 0–9 This is any digit. Shorthand: :d (xiii) a–z Any Lowercase. Shorthand: :l (xiv) A–Z Any uppercase Shorthand: :u (xv) User Set [ ] Enters the brackets with the insertion point between them allowing the user to define either a range of characters or an enumerated set. Defines any character in the user defined set. Shorthand: [ ]

(xvi) User Negative Set [^] Enters the brackets with the caret and the insertion point between them, allowing the user to enter either a range of characters or an enumerated set. Defines any character not in the user specified set. Shorthand: [^]

(xvii) Negation of Pattern (<pattern>) % {!}. This is one of the extensions to previous RE symbols, needed for the unification of RE and Boolean expressions. It matches any text pattern which is NOT the pattern designated by <pattern>.

(xviii) URL Any set of characters that could be a URL (Universal Resource Locator on the Internet). Shorthand: :U This is a derived expression, being a combination of other, elementary expressions.

(xix) Email Address Any legal internet email address. Shorthand: :A This is a derived expression, being a combination of other, elementary expressions.

(xx) European Includes all special characters and characters with diacriticals. Shorthand: :E (xxi) New ¶ The new paragraph character. Shorthand: \r (xxii) New Line The new line character which does not start a new paragraph. Shorthand: \v (xxiii) Space The literal typed space. Shorthand: \s (xxiv) Tab The typed tab character. Shorthand: \t (xxv) Space or Tab. Any "white" or blank space. Shorthand: :b (xxvi) Page Break The explicitly inserted page break character. Shorthand: \f (xxvii) 0+ Means the preceding character, wild card or parenthesized expression is to occur zero or more times and assures the largest possible number of occurrences for a match (that is, longest match). Shorthand: *

(xxviii) 0+ (shortest) This is the same occurrence designator as the previous one except that the match uses the shortest possible number of occurrences. Shorthand: :*

(xxix) 1+ Means the preceding character, wild card or parenthesized expression is to occur one or more times and assures the largest possible number of occurrences for a match. Shorthand: +

(xxx) 1+ (shortest) This is the same occurrence designator as the previous one except that the match uses the shortest possible number of occurrences. Shorthand: :+

(xxxi) 0 or 1 Means the preceding character, wild card or parenthesized expression is to occur zero or one times and assures the largest possible number of occurrences for a match (that is, longest match). Shorthand: –

(xxxii) 0 or 1 (shortest) This is the same occurrence designator as the previous one except that the match uses the shortest possible number of occurrence. Shorthand: :–

(xxxiii) n Times Means the preceding character, wild card or parenthesized expression is to be occurs exactly "n" times. This, and all similar succeeding symbols, when used, require the user to enter the respective numbers into a dialog. Shorthand: {,n}

(xxxiv) To n Times Means the preceding character, wild card or parenthesized expression is to occur from zero to "n" times. Shorthand: {,n}

(xxxv) From m Times Means the preceding character, wild card or parenthesized expression is to occur "m" or more times and assures the longest possible match. Shorthand: {m,}

(xxxvi) From m Times Short Means the preceding character, wild card or parenthesized expression is to occur "m" or more times and assures the shortest possible match. Shorthand: {m,s}

(xxxvii) From n To m Times Means the preceding character, wild card or parenthesized expression is to occur at least "n" times but not more than "m" times and assures the longest possible match. Shorthand: {n,m}

(xxxviii) From n To m Short Means the preceding character, wild card or parenthesized expression is to occur at least "n" times but not more than "m" times and assures the shortest possible match. Shorthand: {n,m,s}

(xxxix) ( The left opening Reference Creating parenthesis. Shorthand: ( (xl) ) The right closing Reference Creating parenthesis. Shorthand: )

(xli) { The left opening NR Parenthesis. Does not begin a reference. Shorthand: :( (xlii) } The right closing NR Parenthesis. Does not close a reference. Shorthand: :)

(xliii) Start Selection This is a marker which determines what part of the Search Pattern is actually to be found, and so selected. Using this, (and the closing End Selection marker, which follows) the text surrounding the actual search pattern of interest can be specified within the same search pattern. Shorthand: :{

(xliv) End Selection This is the second part of the definition of the Search Pattern to be actually found. Shorthand: :}

A combination of Boolean Expressions and Regular Expressions, together with the designation of the Search Target makes for a very powerful search engine.

For example, suppose we wish to search for a document that lists the telephone number of the company Nisus Software Inc.

We do not know the telephone number, we do not know exactly how the company name is listed, for example whether it is Nisus Software, Inc. or if the comma is missing or if the period is missing. The following is an explanation of how a suitable search pattern is made up. We use the Shorthand symbols listed above. In what follows, whenever we need to use literally a symbol or symbols which also have a Shorthand special meaning, we preceded it with the backslash "\" If the special meaning combination includes a backslash and we want to designate the backslash literally, we use two backslashes. For example, the combination s means a space. If we wanted to designate \s literally we would write \\s.

First we make up a Search Pattern for any US Phone number:

:(\(-\s*:d:d:d\)-:)-\s*\--\s*:d:d:d\s*\--\s*:d:d:d:d

As this example makes obvious, the Shorthand notation is quite hard to read, that is why the special, self-explaining, notation is introduced. To use such a notation, we need a menu means to select from, and a display means that distinguishes each symbolic expression from plain text. The latter is done using a custom font system where each symbol (possibly including the descriptive text) is a character in that font. The font is installed into the system file as part of the installation process for the application.

The above Search Pattern for a phone number allows for any phone number with or without the area code, with the area code in parentheses or without parentheses, with dashes between the parts, or without the dashes, with extra spaces between the parts or without spaces. In other words, it is a very liberal text pattern definition of a phone number but it would hardly ever match any text which was not a phone number.

The second Search sub-Pattern for the company name is defined more simply as:

Nisus Software,- Inc\.

The minus following the comma means the comma may occur zero or one time (which means it need not be there). The backslash before the period is needed because in this context the period is meant literally, whereas in the list of Shorthand symbols it means "Any Character." The minus following the period means that it too need not be there.

Finally, to find any sentence containing both the phone number Search Pattern and the company name Search Pattern, we define the Complex Search Pattern as:

Nisus Software,- Inc\. AND :(\(-\s*:d:d:d\)-:)-\s*\--\s*:d:d\s*\--\s*:d:d:d and use it with a search where the Search Target is set to Any Sentence.

The above example illustrates just one application of the present invention. This example Search Pattern could not be defined as easily in any currently existing search engine.

IMPLEMENTATION

Overview

One easy way to implement the invention is to use existing state-of-the-art text search technology (see for example the book "Compilers, Principles, Techniques and Tools" by Aho, Hopcroft, Ullman, published by Addison-Wesley 1986, particularly the section "Practical Algorithms for the Implementation of the Deterministic Finite Automata, revised after McNaughton-Yamada") to develop a GREP search engine, including the unary NOT postfix text pattern negation operator listed in the symbols list above. With this addition, the GREP Search Engine is referred to as the Extended GREP Engine and the expressions it can process are referred to as the Extended Regular Expressions.

The invention is unique in that it combines both the full Boolean search and the Extended GREP search. This can be done using two separate interpreters, one for GREP the other for Boolean expressions. Such an implementation requires the user to maintain that separation (between GREP and Boolean parts of the search expression) which means using different Boolean and GREP parentheses and distinguishing between the GREP Or and the boolean OR. These distinctions, from the point of view of the user, are totally artificial and unnecessary, brought about by the distinction that has been kept within the subject through its evolution. In addition, implicit concatenation is intuitively defined for GREP expressions but is not defined for many Boolean expressions. For example, a boolean expression such as (A AND B) concatenated with (C AND D) will give an error in the Boolean interpreter, whereas its intuitive meaning as a GREP expression would be:

(A:..*B Or B:..*A)(C:..*D Or D:..*C)

Although a new design for a unified parser and search engine can be easily developed to better implement the invention, an alternative method of implementing it is described here, which provides the same result through a simple pre-processor, allowing existing code bases for the GREP and Boolean interpreters to be used.

In a mixed Boolean-GREP environment, the GREP Or binary operator has the same meaning as the Logical "OR" operator except that in most implementations it is higher in precedence than the logical "OR." As is explained below, the pre-processor replaces the Logical "OR" with the GREP "Or." To avoid confusion, the user is not allowed direct access to the GREP Or, providing only one "OR." The Logical "AND" and related binary operators can be synthesized entirely from GREP expressions. The user is presented with only one class of parentheses: the GREP type.

The Pre-processor General

The mixed boolean-GREP expression entered by the user is converted by the Pre-Processor to an Extended Regular Expression (using the replacements detailed in the GREP Table) which is then processed by the Extended GREP Engine.

The following step-by-step process describes the construction of the Pre-Processor.

The binary boolean operators which need interpreting are: AND, OR, NEAR, FOLLOWED BY and the combinations AND NOT and NOT FOLLOWED BY. The unary boolean operator (prefix) is NOT. The equivalent (postfix) Extended Regular Expression operator is designated as % {!}. As mentioned above, the pre-processor replaces the logical OR operator by the GREP Or.

The Pre-processor Details

The "User Expression" or UE is the expression entered by the user. This expression comprises extended GREP expressions possibly joined with binary boolean operators, possibly modified by the unary operator, and possibly including parentheses which may be Reference Parentheses or Non-Reference.

The pre-processor, in one or more passes, modifies UE converting it entirely to an Extended Regular Expression. Each pass through the Pre-processor replaces one Boolean operator with an equivalent GREP expression, and so each time modifies UE into the "Current Expression" or CE until that expression becomes entirely an Extended Regular Expression and so can be passed to an Extended Grep Engine.

Initially, the Current Expression is the User Expression or CE=UE. If CE contains no boolean operators, omit all steps of the pre-processor, passing CE directly to the Extended Regular Expression (ERE) engine. If CE does contain at least one boolean operator, the pre-processor is passed the CE and each of the pre-processing step comprises the following:

1 Identify Boolean Operators and Operands. Scan the CE string for the location of the highest precedence Boolean operator. If the operator is binary, identify the two operands. Then split CE=CE1+A Op B+CE2, where "Op" is the Boolean binary operator and A and B are respectively its left and right operands. If Op is a unary operator, then split CE=CE1+Op B+CE2. Each expression is a string of symbols and the plus sign designates string concatenation. Then use the GREP Table to replace A Op B (or just Op B) with the appropriate extended Grep expression. Then repeat the process until no further Boolean operators remain.

The following steps identify the operator (Op) and operands (A,B)

(i) Scan UE checking for syntax errors. The common syntax errors are the following:

(a) Unmatched parentheses. These are checked by scanning CU from left to right while keeping a sum of the parentheses count, where each closing parenthesis contributes −1 and each opening parenthesis contributes +1. If at any time the sum is negative, stop the scan and return an error of unmatched parentheses. If the parentheses sum is non-zero when the scan completes, likewise report an unmatched parenthesis error. (b) If any Binary or Unary Boolean operator is immediately followed by a closing parenthesis, or ends an expression, report an error. (c) If any Binary boolean operator is preceded with an opening parenthesis, or begins an expression, report an error. (d) If any two Binary operators follow each other with no intervening expression, report an error. (e) If the Unary operator NOT is immediately followed by any boolean operator except FOLLOWED BY report an error. If NOT FOLLOWED BY is encountered as the NOT Unary operator followed by the FOLLOWED BY Binary operator, replace the combination with the equivalent single Binary operator. (f) If the Unary operator NOT is followed by any other operator, report an error.

(ii) Initialize the parenthesis count to zero.

(iii) Scan the CE string from left to right identifying each boolean operator and its precedence. Identify one with the highest precedence and store it in Op.

(iv) If Op is a Unary operator skip this step. If Op is a binary operator scan characters to the left of Op accumulating the scanned characters and storing them in A (in the same direction as they occur in the string CE, even though scanning is from right to left, that is, reverse order) accumulate also the count of parentheses by counting each closing parenthesis encountered as −1 and each opening parenthesis as +1, until the first one of the following three possibilities occurs: (a) The beginning of the string is reached; (b) a boolean operator is encountered when the parenthesis total count is zero; (c) an opening parenthesis is encountered which, when added to the parenthesis count total, makes the total +1. At that point the left operand is A which excludes the last opening parenthesis, if present, when condition (c) is satisfied, and excludes any operator which caused condition (b) to be satisfied. Re-set the parenthesis count to zero.

(v) If Op is a binary or a unary operator scan characters to the right of Op accumulating the scanned characters and storing them in B. Accumulate also the count of parentheses by counting each closing parenthesis as −1 and each opening parenthesis as +1, until the first one of the following three possibilities occurs: (a) The end of the CE string is reached; (b) a boolean operator is encountered when the parenthesis total count is zero; (c) a closing parenthesis is encountered making the parenthesis count total −1. At that point the right operand is B which excludes the last closing parenthesis, if present, when condition (c) is satisfied, and excludes any boolean operator which caused condition (b) to be satisfied. Re-set the parenthesis count to zero.

The result is an extended GREP expression and this is passed to the extended GREP engine to parse and carry out the search.

GREP TABLE

The following table is used in the replacement of booleans with GREP expressions. The symbols <AND>, <NOT>, etc. represent boolean operators. The expression "Or" is the GREP disjunctive. The uppercase letters A, B, C, stand for any Extended Regular Expressions. The parentheses are for grouping and indicating order of evaluation. The other symbols stand for the Extended Regular Expression whose meanings are listed in the previous section. They are not to be confused with the literal meanings of the characters. When the resulting ERE is passed to the ERE parser, that distinction is maintained by that parser.

| Boolean to Extended GREP Conversion Table | |
|---|---|
| Boolean (input) | Extended GREP (output) |
| A<AND>B | :(A:..:*B Or B:..:*A:) |
| A<OR>B | :(A Or B:) |
| A<NEAR(n)>B | :(A :w{,n} B Or B :w{,n} A:) |
| A<FOLLOWED BY>B | :(A:..:*B:) |
| <NOT> B | :(B%{!}:) |
| A<AND><NOT>B | :(:(:(A:..:*B:) Or :(B:..:*A:):)%{!}:) |
| A<NOT FOLLOWED BY>B | :(A:..:*B%{!}:) |

THE LIST SEARCH FEATURES

Quite often, particularly for automated taxonomy applications described below, it is useful to be able to search for any one of a long list of Search Patterns. In that case it is very convenient to add an explicit feature, which we shall call the List Search feature, rather than have to type the list using the binary disjunctive operator OR between the words in the list.

When the user chooses this feature from a menu, a special window opens allowing the user to enter the list (by either typing or choosing from a vocabulary list) without the need to add the OR boolean operator between the words. The user can then name each such list and save any number of such lists for later recall and use. Once named, the name of the list would identify it in the Find window.

Treating these lists as special cases allows both an improvement of the interface and a speed-up of the search.

Several different ways to speed-up searching can be devised. First is the ability to combine similar patterns.

When searching for any one of a number of Search Patterns defined by such a list, it is possible to optimize the search engine in the following way.

The list of Search Patterns is first scanned for any similarities. Quite often, parts of these patterns will be similar to one another. In that case it is relatively easy to create a more optimal search pattern by combining those Search Patterns which have a significant portion of their sub-patterns in common. For example, if we were making up a list that would find articles on searching algorithms for programming search engines a possible partial set of three of the patterns in such a list would be the following:

search engine algorithms– programming search engines searching algorithms–

These could be combined into the following single Search Pattern, to which we shall refer as the "Hybrid Pattern:"

(programming)–\s+search(ing)–\s+(engines-)–\salgorithms–

Although this Hybrid Pattern covers the three given Search Patterns, it also covers other hybrids of the patterns given. For example it would also find the text: "programming searching algorithms." Although this is not one of the stipulated Search Patterns, it certainly makes sense to have it be part of the list. However, in general, the user should be given the chance to choose to either include all such hybrid patterns or exclude them.

If the user chooses to exclude the hybrid matches that are not explicitly in the list (refer to these as the "introduced hybrids") the search engine would still use the more optimal search pattern but after finding a match, would double check if the match was included in the original list. Such a procedure will almost always be faster than using the original list for the following reason.

Using the original list, the engine would have to check each part of the text for every one of the patterns. Using the Hybrid Pattern therefore saves considerable time and once a match is found, only a much smaller portion of text, the Matched Text, would need to be checked against the small sub-list of those Search Patterns that were combined to form the Hybrid Pattern.

The second alternative speed-up process would use a simple hashing function to reduce each of the listed words to say a 16 bit number. A simple sum-of-bytes hash function would work. Then each word of the text being searched would then be similarly hashed and the result compared to each of the hashes of the words in the list. In that way, each word comparison is reduced to a two-byte comparison, speeding up the process at the slight expense of hashing each word of the text being searched. The expense would be unimportant for the case of static text as the text can also be stored as a sequence of two-byte hashes ahead of the time a search is needed.

APPLICATIONS

A search engine with these capabilities can be suitably interfaced (following the example of Nisus Writer's PowerFind) to allow the end user to specify their text content searches, using menu lists, with just as much precision as desired.

Such a search engine can also be used as the basis for an automated system for categorizing textual content, a field known in the industry as Taxonomy.

For example, a set of key descriptive words, called categories, can be used to describe a database of textual information.

The user defines a set of simple or complex Search Patterns for each pre-defined category. The search engine then scans the text database. Each file or document, found to contain any one of these search patterns within the target, is automatically assigned the associated category.

In addition, any sub pattern within the Search Pattern parenthesized using the Referencing Parentheses, would be designated as a category creating pattern. When such a sub-pattern is matched as part of the whole defined Search Pattern, the referenced text match would be used to create a new category (if it did not already exist) and assign it to the found object.

In that way, users can easily program the search engine for automated taxonomy of text databases.

Such a high level programming tool is a very valuable invention for use in taxonomy because of the ease with which changes can be made in the categorizing Search Patterns. Such changes would make it possible for continual and easy refinement of the pattern matching expressions.

The combination of a full extended boolean search with a full text pattern description language creates a very powerful advanced search engine with numerous applications.

SUMMARY

In summary, the invention generalizes the Search Pattern description language to combine the existing Extended Regular Expression symbol set with a fully extended Boolean operator set and additionally provides the user with a choice of Search Targets. Extensions include the boolean binary operator FOLLOWED BY, its opposite NOT FOLLOWED BY, the definition of concatenation of boolean expressions, and the LIST SEARCH features.

I claim:

1. A method of searching text data, in a computer system, including means for specifying a text pattern to be matched to said text data, within a search target said means comprising a language used to compose a search expression describing said text pattern, said language comprising regular expressions and a plurality of boolean operators, said method further comprising user means to specify said search expression, wherein said boolean operators are selected from a group consisting of AND and NOT and NEAR and FOLLOWED BY and NOT FOLLOWED BY and PERHAPS.

2. The methods of claim 1 wherein said FOLLOWED BY operator is interpreted as an order requiring AND requiring that the two expressions joined with said FOLLOWED BY operator are to occur in the order presented within the target text.

3. The methods of claim 1 including means by which a user can specify a number representing the maximum number of words between the texts matched by said regular expressions on either side of said NEAR boolean operator.

4. The methods of claim 1 wherein said search expression, describing said text pattern, comprises a first sub-expression followed by said PERHAPS operator followed by a second sub-expression, further wherein said search method comprises the steps of:

i) searching for a match to the first sub-expression, noting where within said text data said second sub-expression is also matched;

ii) if on completing said search, said target does not contain a match to both said sub-expressions, returning the result of the match to said first sub-expression alone;

iii) if on completing said search, there is at least one match to both said sub-expressions, returning the match result to said both sub-expressions.

5. The methods of claim 3 further including means for selecting search type.

6. The methods of claim 5 wherein said search type is selected from a group consisting of literal search with boolean operators, approximated search with boolean operators, regular expression search with boolean operators.

7. The methods of claim 6 including means for user entry of said regular expressions and said boolean operators.

8. The methods of claim 7 wherein said regular expressions and said boolean operators when entered by said menu means, display as descriptive text blocks.

9. The methods of claim 8 including further menu means for user entry of pre-defined search expressions.

10. A method of searching text data, in a computer system, including means for specifying a text pattern to be matched to said text data, within a search target said means comprising a language used to compose a search expression describing said text pattern, said language comprising regular expressions and a plurality of boolean operators, said method further comprising user means to specify said search expression, further including means for specifying said search target.

11. The methods of claim 5 wherein said search target is selected from the group consisting of a word and a sentence and a paragraph and a document.

12. A method of searching text data, in a computer system, including means for specifying a text pattern to be matched to said text data, within a search target said means comprising a language used to compose a search expression describing said text pattern, said language comprising regular expressions and a plurality of boolean operators, said method further comprising user means to specify said search expression, further including methods of an optimized search for said text pattern when said text pattern consists of a boolean search comprising a plurality of text strings disjunctively connected with the OR boolean operator between each pair of said strings, said methods comprising the steps of:

i) combining the strings into a single efficient regular expression;

ii) carrying out the search using the combined efficient regular expression;

iii) once a match is found, checking through the original list, if necessary, to confirm or deny the match.

13. A method of searching text data in a computer system, the method comprising:

a) constructing a plurality of regular expression (RE) terms, each RE term using a plurality of different nonliteral RE symbols to describe a class of text patterns;

b) modifying the plurality of RE terms by a plurality of different Boolean operators to form a Boolean RE search pattern; and c) identifying, as a match for the Boolean RE search pattern within a search target, a text expression within the search target that is a member of a class of text expressions defined by the Boolean RE search pattern.

14. The method of claim 13, further comprising d) forming a number of different Boolean RE search patterns for a corresponding plurality of different searches; and e) employing a set of Boolean operators including operators substantially similar to AND, OR, NOT, NEAR, FOLLOWED BY and NOT FOLLOWED BY, such that each of the operators is used in at least one of the plurality of Boolean RE search patterns.

15. The method of claim 13, further comprising providing, for the step of constructing a plurality of RE terms, a plurality of symbols interpretable to represent a substantially complete set of nonliteral RE operators.

16. The method of claim 13, further comprising providing, for the step of constructing a plurality of RE terms, a plurality of symbols interpretable to represent a substantially complete extended set of RE operators.

17. The method of claim 13, further comprising specifying a subset of less than an entire text document as a search target.

18. The method of claim 14, further comprising:

f) providing, for the step of constructing a plurality of RE terms, a plurality of symbols interpretable to represent a substantially complete set of nonliteral RE operators; and g) specifying a subset of less than an entire text document as a search target.

19. The method of claim 13, further comprising the step of receiving the Boolean RE search pattern from a user.

20. The method of claim 19, further comprising the step of providing, for the step of constructing a plurality of RE terms, a plurality of symbols interpretable to represent a substantially complete extended set of RE operators.

21. A method of searching text data in a computer system, the method comprising:

a) providing representations of a substantially complete set of nonliteral regular expression (RE) symbols for specifying RE terms that each denote a class of text patterns;

b) providing a set of Boolean operator symbols for specifying a multiplicity of different Boolean operators;

c) accepting, as a search query, a Boolean RE text description that includes a plurality of RE terms joined by a plurality of Boolean operators;

d) examining text in a search target; and e) parsing the Boolean RE text description to determine if text within the search target is a member of the class of text patterns defined by the Boolean RE text description.

22. The method of claim 21, further comprising preprocessing the Boolean RE text description by converting the Boolean RE text description to a special descriptive language.

23. The method of claim 22, wherein the special descriptive language is substantially equivalent to symbols representing Extended Regular Expressions.

24. The method of claim 21, further comprising:

f) providing parenthesis grouping operator symbols; and g) providing search target specification symbols configured to define subsets of text documents;

and wherein step (c) further includes i) accepting a plurality of parentheses grouping operators, and ii) accepting a specification of the search target that is less than an entire text document.

25. The method of claim 22, wherein step (e) is performed by a GREP parser.

26. The method of claim 21, wherein the Boolean RE text description is accepted from a user.

27. The method of claim 26, further comprising the step of preprocessing the Boolean RE text description by converting the Boolean RE text description to a special descriptive language.

* * * * *

UNITED STATES PATENT AND TRADEMARK OFFICE
CERTIFICATE OF CORRECTION

PATENT NO. : 6,681,217 B1
DATED : September 29, 2003
INVENTOR(S) : Jerzy Lewak

It is certified that error appears in the above-identified patent and that said Letters Patent is hereby corrected as shown below:

<u>Column 14,</u>
Lines 16, 21, 24, 40, 42, 46, 48, 51 and 62, "methods" should read -- method --.
Line 62, "claim 5" should read -- claim 10 --.

Signed and Sealed this

Twenty-first Day of June, 2005

JON W. DUDAS
*Director of the United States Patent and Trademark Office*